United States Patent
Henry et al.

(10) Patent No.: US 10,873,848 B1
(45) Date of Patent: Dec. 22, 2020

(54) SYSTEMS AND METHODS PROVIDING A STATION WITH A SUGGESTION TO TRANSITION FROM WI-FI TO LTE

(71) Applicant: Cisco Technology, Inc., San Jose, CA (US)

(72) Inventors: Jerome Henry, Pittsboro, NC (US); Malcolm Muir Smith, Richardson, TX (US); Vishal Satyendra Desai, San Jose, CA (US); Robert Edgar Barton, Richmond (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/542,948

(22) Filed: Aug. 16, 2019

Related U.S. Application Data

(60) Provisional application No. 62/858,789, filed on Jun. 7, 2019.

(51) Int. Cl.
| | | |
|---|---|---|
| *H04W 4/00* | (2018.01) | |
| *H04W 8/12* | (2009.01) | |
| *H04W 24/10* | (2009.01) | |
| *H04W 76/11* | (2018.01) | |
| *H04W 76/19* | (2018.01) | |

(52) U.S. Cl.
CPC ............ *H04W 8/12* (2013.01); *H04W 24/10* (2013.01); *H04W 76/11* (2018.02); *H04W 76/19* (2018.02)

(58) Field of Classification Search
CPC ....... H04W 8/12; H04W 76/19; H04W 76/11; H04W 24/10
USPC ....... 370/329–334; 455/432.1–433, 436–444
See application file for complete search history.

(56) References Cited

U.S. PATENT DOCUMENTS

| | | | | |
|---|---|---|---|---|
| 10,383,039 B2 * | 8/2019 | Henry | .................. | H04W 48/16 |
| 10,455,462 B1 * | 10/2019 | Desai | .................. | H04W 36/30 |
| 10,462,015 B1 * | 10/2019 | Henry | .................. | H04W 16/18 |

(Continued)

FOREIGN PATENT DOCUMENTS

WO    WO 2015/184379 A2    12/2015

OTHER PUBLICATIONS

International Search Report and Written Opinion from the International Searching Authority, dated Aug. 11, 2020, 12 pages, for corresponding International Patent Application No. PCT/US2020/034343.

*Primary Examiner* — Thai D Hoang
(74) *Attorney, Agent, or Firm* — Polsinelli PC

(57) ABSTRACT

A method performed by a system which manages station transition from a Wi-Fi access point includes sending, based on the station roaming to an edge-of-domain access point, a request to neighboring access points to the edge-of-domain access point for neighbor reports. The method includes receiving a cellular signal value from the station, comparing a first signal grade associated with the edge-of-domain access point to a second signal grade associated with the cellular signal value to yield a comparison and generating a link usability rating associated with a link between the station and the edge-of-domain access point. Based at least in part on the comparison and the link usability rating, the method includes transmitting a message to the station suggesting that the station roam from the edge-of-domain access point to a cellular network. An edge of the domain can also be dynamic and vary based on station characteristics.

20 Claims, 10 Drawing Sheets

(56) References Cited

U.S. PATENT DOCUMENTS

| | | | |
|---|---|---|---|
| 10,477,390 B1* | 11/2019 | Verma | H04W 12/1004 |
| 10,574,670 B1* | 2/2020 | Verma | H04L 63/205 |
| 2012/0135728 A1* | 5/2012 | Karpoor | H04W 48/16 |
| | | | 455/432.1 |
| 2013/0136018 A1* | 5/2013 | Jeong | H04W 52/50 |
| | | | 370/252 |
| 2014/0105195 A1* | 4/2014 | Balasubarmaniyan | |
| | | | H04W 48/20 |
| | | | 370/338 |
| 2014/0126544 A1* | 5/2014 | Khay-Lbbat | H04W 36/30 |
| | | | 370/332 |
| 2014/0364115 A1* | 12/2014 | Fidler | H04W 8/02 |
| | | | 455/432.1 |
| 2015/0282032 A1 | 10/2015 | Gupta et al. | |
| 2016/0073316 A1 | 3/2016 | Calcev | |
| 2017/0063828 A1* | 3/2017 | Zhou | H04W 12/0403 |
| 2017/0064618 A1 | 3/2017 | Katar et al. | |
| 2019/0116539 A1* | 4/2019 | Kolar | G06N 20/00 |
| 2020/0008169 A1* | 1/2020 | Henry | H04W 24/08 |
| 2020/0162889 A1* | 5/2020 | Desai | H04W 8/24 |

\* cited by examiner

Neighbor Report Information Element (IE) details 200

| Byte 202 | Function 204 | Value 206 | Description 208 |
|---|---|---|---|
| 1 | Element ID | Fixed | Identifies Neighbor Report IE |
| 2 | Length | Variable | Depends on the number and length of optional subelements, minimum = 13 (decimal) if no optional subelements are present |
| 3-8 | BSSID | Variable | MAC address of AP client is being advised to associate to include reachability of AP, security, capabilities of AP. |
| 9-12 | BSSID Information | Variable | Mobility domain of the AP indicated by this BSSID |
| 13 | Operating Class | Variable | Operating Class indicates the channel set of the AP indicated by this BSSID.Country, Operating Class, and Channel Number together specify the channel frequency and spacing for the AP indicated by this BSSID. |
| 14 | Channel Number | Variable | Channel Number indicates the last known operating channel of the AP indicated by this BSSID |
| 15 | PHY Type | Variable | The PHY Type field indicates the PHY type of the AP indicated by this BSSID |
| 16 | Optional Subelements | Variable | |

FIG. 2

SYSTEMS AND METHODS PROVIDING A STATION WITH A SUGGESTION TO TRANSITION FROM WI-FI TO LTE

CROSS-REFERENCE TO RELATED APPLICATIONS

This application claims priority to U.S. Provisional Application No. 62/858,789, filed on Jun. 7, 2019, the content of which is incorporated herein by reference in its entirety.

TECHNICAL FIELD

The subject matter of this disclosure relates in general handoff decisions between a first Wi-Fi network to a second cellular network and more particularly to an approach in which an access point in a Wi-Fi network provides a suggestion or instruction to a mobile station to transition from the Wi-Fi network to the cellular network.

BACKGROUND

Mobile stations at an edge of a Wi-Fi network need to arbitrate between staying on the wireless network that is available and disconnecting from the Wi-Fi network and transferring traffic to a cellular network such as LTE (Long Term Evolution). There might be a signal in connection with the Wi-Fi network but it may be unusable because the signal is too low or upstream or downstream traffic is having problems. Transferring traffic from one network to another can have associated costs. Typically, mobile stations attempt to stay on a Wi-Fi network as it provides greater bandwidth and stability relative to a cellular network. Mobile stations only transition to a cellular network as a last resort. The process to make the transition decision takes time. Often, the analysis and transition takes 5 to 10 seconds before the mobile station decides that the Wi-Fi network is no longer sustainable. This delay is an issue for real-time applications and causes periods of dead traffic.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2 illustrates an example set of neighbor report information element details;

DETAILED DESCRIPTION

Figure 1:
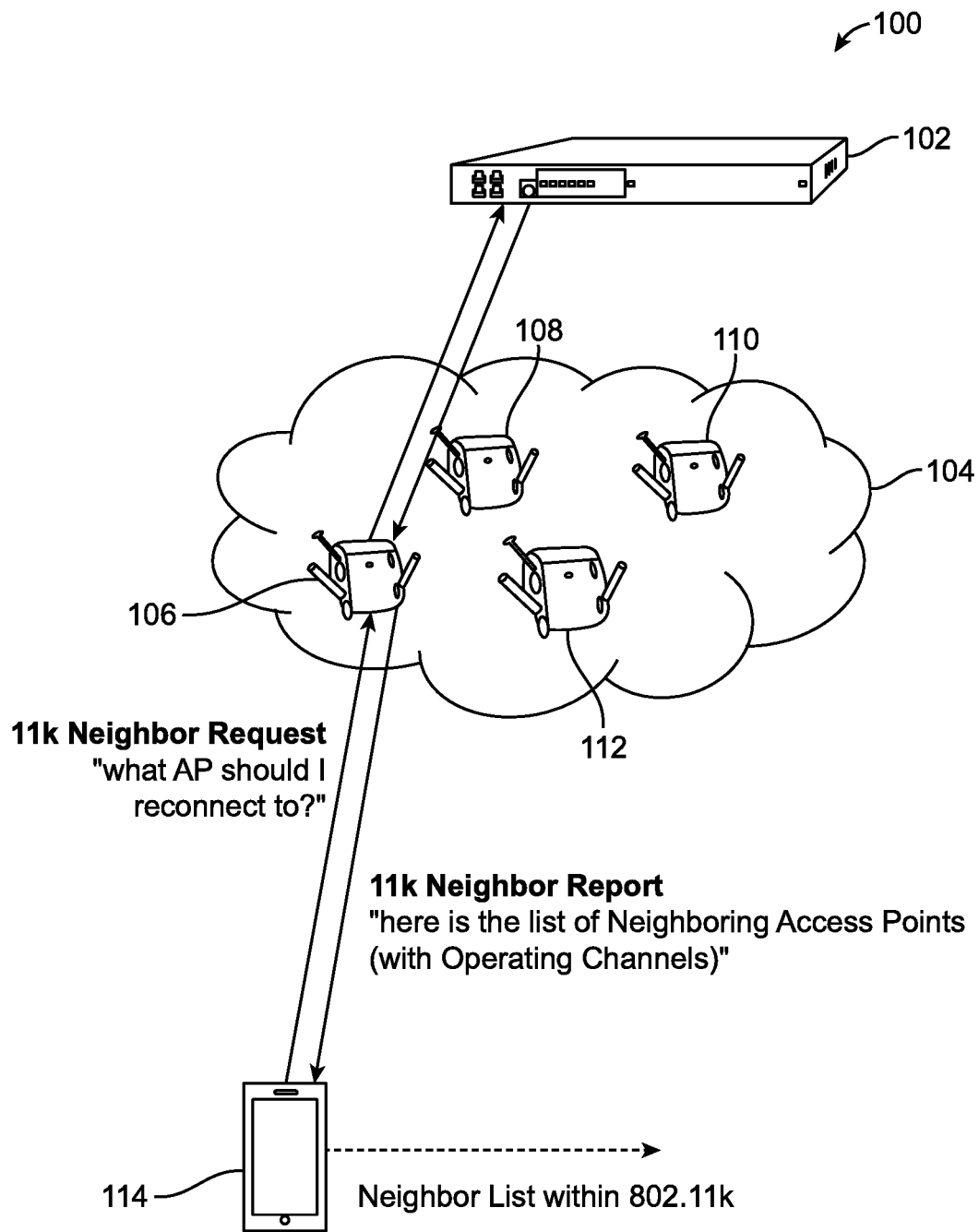
FIG. 1 illustrates a network environment which includes access points and neighbor requests and reports.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

There is a need for a mechanism by which a mobile station can get fast information about the usability of a Wi-Fi network so as to avoid dead periods in a process of transitioning to a cellular network. There are multiple challenges to resolving this issue. The mobile station does not know when it is at the edge of the Wi-Fi network domain. The mobile station has a limited view about upstream traffic. For example, the mobile station measures the downstream received signal but has a limited view on how the access point receives the upstream flows. The mobile station does not know if a lack of ACKs (acknowledgment signals) is a temporal problem from collisions or a structural problem such as where the Wi-Fi network has become unusable. Additionally, the Wi-Fi network domain edge position can depend on the physical structure of the mobile station form factor. These issues can be resolved by virtue of the innovation disclosed herein.

In one example, a method includes sending, based on a station roaming to an edge-of-domain access point, a request to neighboring access points to the edge-of-domain access point for neighbor reports, receiving a cellular signal value from the station and comparing a first signal grade associated with the edge-of-domain access point to a second signal grade associated with the cellular signal value to yield a comparison. The method includes generating a link usability rating associated with a link between the station and the edge-of-domain access point. Based at least in part on the comparison and the link usability rating, the method includes transmitting a message to the station suggesting that the station roam from the edge-of-domain access point to a cellular network. The message can also include an instruction that the mobile station must implement to start the transition.

Further, an edge of the domain which includes the edge-of-domain access point can be dynamically defined based on characteristics of individual stations.

Description of Example Embodiments

Disclosed herein are systems, methods, and computer-readable media which provide a number of different approaches for providing a mobile station information as well as instructions or suggestions regarding when to transition from a Wi-Fi network to a cellular network in advance of when the mobile station might independently decide to make such a transition period shorter with no perceptible dead traffic time.

This disclosure will draw upon a number of capabilities built into the Wi-Fi standard 802.11k. Disclosed is a method to enable a management system such as a traditional wireless LAN controller (WLC) or Digital Network Architecture Center (DNAC) to evaluate a Wi-Fi client connection quality, and compare this quality to potential cellular or LTE link quality. With this information, the system can push a client at the edge of the Wi-Fi domain to LTE when necessary and thus avoid the dead air of clients attempting to maintain their Wi-Fi connection at all costs. In some cases, clients seek to maintain the Wi-Fi connection until it has become almost completely unusable which can result in several seconds of failure to communicate while the client timers (e.g. 802.11 retries) progressively exhaust. The proposed method is dynamic, adaptive and also offers a predictive model by client types which can cause a geographic change in the definition of the edge of the Wi-Fi domain. The system can learn from client reactions where the best jump-to-LTE trigger should be located.

Applicant notes that the present disclosure can apply to any Wi-Fi network or to any similar wireless communication protocol. With respect to the cellular network, the LTE protocols often mention but the principles would apply to any cellular network. In a broader aspect, the principles disclosed herein can also apply to a first network having a first protocol type and to a second network having a second protocol type. Thus, the concepts can apply to different networks of different types with respect to both the transition process from one network to another as well as to the dynamic definition of the edge of a domain of the first network based on client characteristics.

The framework for the 802.11k protocol includes a "Wireless Local Area Network (WLAN) Radio Measurements" capability which can enable any device, access point (AP), mobile station or client with the capability to better understand the environment in which it is operating. A variety of requests can be generated for which the device receiving a request can respond with a report.

As one example, an AP could ask a client "how well are you hearing me?" using a link measurement request. The client would respond with a link measurement report. Conversely, a client could ask an AP "how well are you hearing me?" and get a response. Since the ability to measure and collect information is provided, a device submitting a request can make a better informed decision as to its "next steps" in adapting to/compensating for the dynamics of the WLAN environment.

Information obtained from a measurement and/or report can be made available to upper layers of the measuring and/or requesting device where it may be used for a range of applications. Such applications may be engaged in attempting to preserve the QoE (Quality of Experience) for the end user.

As one example, in order to preserve the QoE for applications such as VoIP and video streaming, WLAN Radio Measurements may be used by client device to collect information from the AP prior to that client device disassociating from one AP and re-associating to a new AP. This can dramatically speed up reconnecting from one AP to another AP in the same WLAN.

802.11k describes the following measurements in connection with a WLAN Radio Measurement process: beacon; frame; channel load; noise histogram; mobile station statistics; location configuration information; neighbor report; link measurement and transmit stream/category measurement. The feature that this disclosure applies and expands upon is the neighbor report. FIG. 1 illustrates the operation in a network 100 of the neighbor report.

The neighbor report request is sent from a client 114 to an AP 106. The request asks "what AP should I reconnect to?". The AP 106 returns the neighbor report containing information about neighboring APs that are known candidates 108, 110 or 112 for the client 114 to re-associate with (should the client 114 choose to do so). The report can include the respective operating channels for the APs. The neighbor report request/report pair enables the client 114 to collect information about the neighboring APs 108, 110, 112 of the AP 106 it is currently associated with. This information can be used as identification of potential candidates for a new point of attachment while roaming.

The benefits of the neighbor/request report can include the ability to speed up scanning. Instead of the client 114 engaging in time consuming scanning activity (either actively probing for APs or passively listening to every channel for beacons), the client 114 can instead narrow its list down to the known available neighbors 108, 110, 112. This is especially useful in high density environments where multiple WLANs can be heard by the client. The report can reduce client power consumption or the time taken by scanning (especially active scanning), which also consumers battery power for the client. Since the neighbor report provides information before roaming, less power may be consumed. Additionally, the neighbor report can be a more efficient use of WLAN "air time" where active scanning is not only time consuming from the perspective of client resources (cpu, memory, radio, etc.), it's also "air time" consuming. For example, a client that is not neighbor-aware will likely engage in so-called wildcard probe requests (some clients will burst these). In this scenario, every AP that hears the probe request will generate a probe response. In other words, for a single client, a number N of APs will generate N probe responses. If multiple clients engage in wildcard probing, then the RF environment can quickly become "polluted" with management traffic simply because the clients are not using neighbor request. This has a negative impact for the entire WLAN.

Figure 3A:
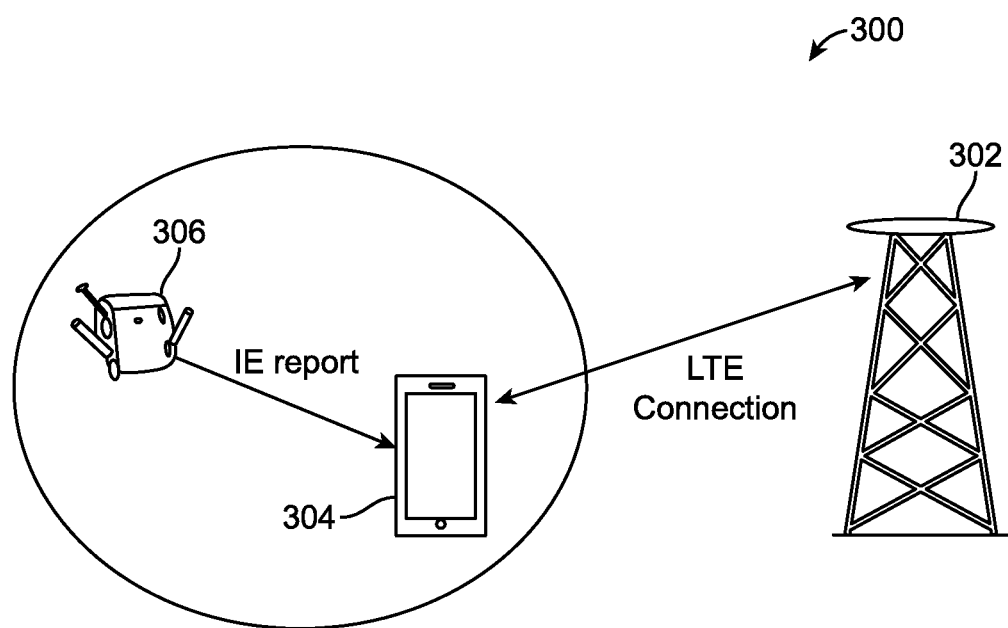
FIG. 3A illustrates a basic IE report approach including reference to an access point and a cell tower.

FIG. 3A illustrates another type of report, which is the LTE Information Element (IE) report. The client or mobile station can provide a number of different types of information via an IE report. One relevant parameter might be a WAN metrics element which provides information about the WAN link connecting an IEEE 802.11 AP and the Internet. Transmission characteristic such as the speed of the WAN connection to the Internet can be included. For purposes of this disclosure, as is shown in the network 300 of FIG. 3A, it is assumed that the mobile station 304 in an IE report provides data about the state of their cellular connection 302 to the Wi-Fi AP 306.

Figure 3B:
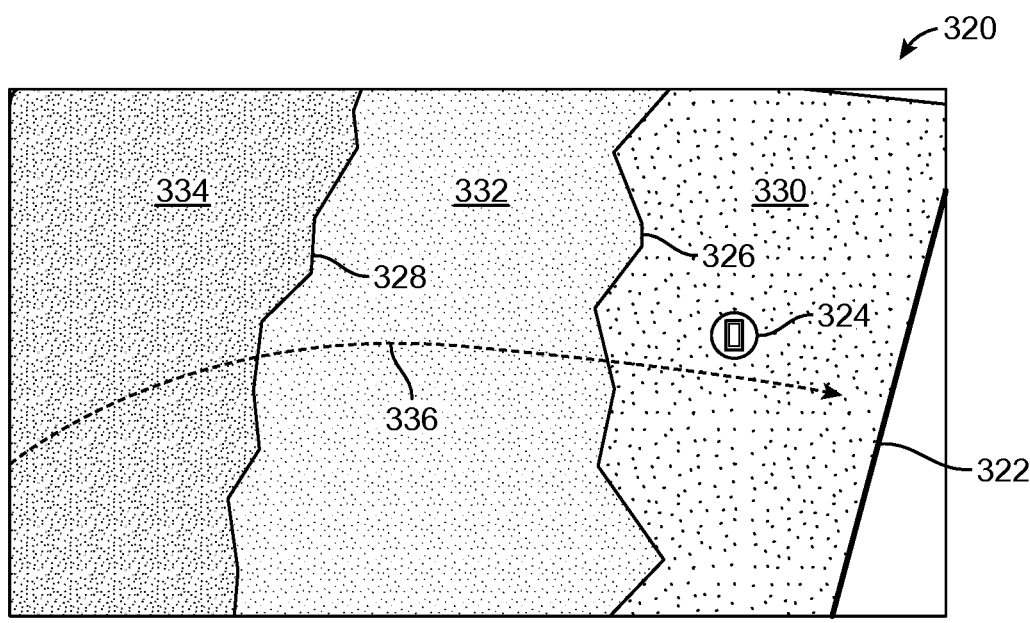
FIG. 3B illustrates a cellular coverage map.

FIG. 3B illustrates another aspect of this disclosure with respect to how the system might generate a cellular coverage map 320 for a device. In one aspect, a station 324 can send a specific IE to the system that contains its LTE signal values. Example values or parameters that can be included are one or more of a type, a level, and a cell ID. Other parameters are contemplated as well, such as historical information, timing information, personal information associated with the user, and so forth. This informs the system on the availability of LTE and graded signals at the current station location and allows a comparison to an equivalent Wi-Fi signal grade. The result of the comparison can be values such as great, good, poor and so forth. The IE can be sent by any SSG (subscriber service group) station along with a form factor, cell ID and/or other elements allowing the system to project an LTE cellular coverage map for the device and the devices of the same type at any known point of the network. One aspect of this disclosure includes the concept of retrieving data from individual stations regarding their cellular signal values and generating a coverage map. The coverage map could be configured for an individual station or a group of stations of the same type. Therefore, for one Wi-Fi domain, there could be one coverage map for tablets and another coverage map for a first type of mobile devices and the second coverage map for a second type of mobile devices.

FIG. 3B illustrates a first coverage region 330, a second coverage region 332 with a defined boundary 326 between the two. A boundary 328 defines the line between coverage region 332 and region 334. The edge of the domain is defined as feature 322 in FIG. 3B. The path 336 of the mobile device 324 is also shown in this figure.

Figure 3C:
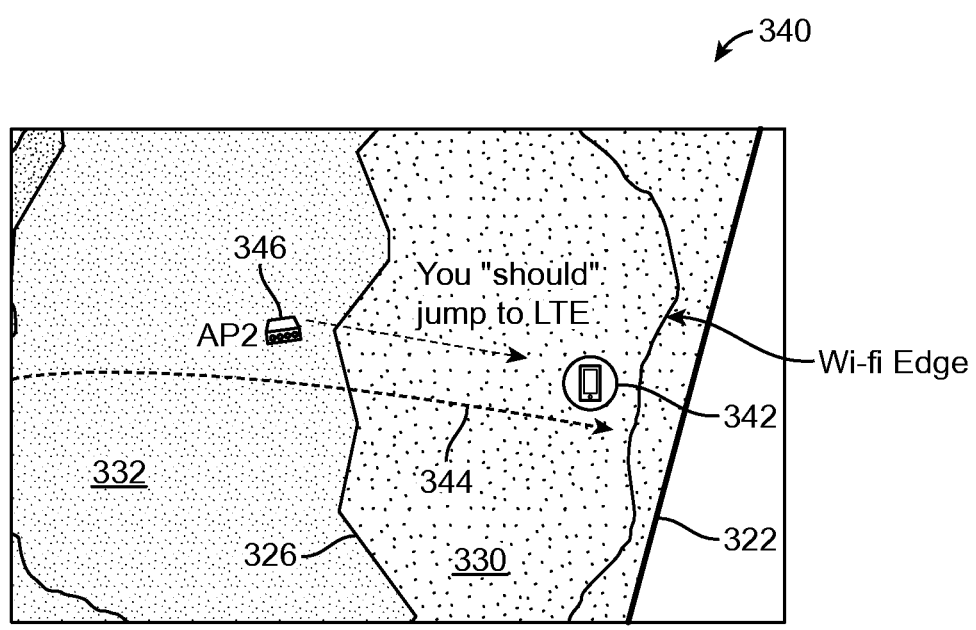
FIG. 3C illustrates a coverage map and a suggestion to a device to jump to a cellular network.

FIG. 3C further illustrates an environment 340 with a Wi-Fi edge, a station 342 with a path 344 moving towards the edge, and the first cellular region 330, a second cellular region 332 and a boundary 326. The edge AP2 346 is shown as well.

A novel approach is disclosed herein for sending an LTE IE from a mobile station to the system at an appropriate time. The timing in one aspect can be related to each time the LTE signal changes significantly, which can be determined in terms of x dBm, one bar up or down, or some other method. The system can also detect that the station is that the edge of the usable network, and the system can compare the LTE signal grade, like an LTE heat map, to the Wi-Fi signal grade. The system can, for example, use a Wi-Fi heat map based on RSSI (received signal strength indication) and load. It is typical that the Wi-Fi network tends to be preferred by stations to cellular, usually for costs and bandwidth reasons.

The aggressiveness of the boundary 322 can be configurable. For example, the system can establish that the Wi-Fi is preferred in certain situations to ensure the best throughput or connection experience. In order to evaluate the Wi-Fi link, the system starts by comparing the upstream link (UL) signal to the downstream link (DL) signal, and provides an asymmetry coefficient which matches the differences between the UL and DL signals. The system can also evaluate the retry rate which can be measured for each station, the downstream signal at the AP level and the upstream signal by counting the proportion of frames coming to the AP radio with the retry bit set to one.

A retry coefficient can also be applied, with a higher value as the retry rate increases. A second retry asymmetry coefficient can measure the difference between the UL retry count and the DL retry count. All these coefficients are applied to the station RSSI level to yield or result in the linked usability rating. As the RSSI downgrades, and as asymmetry between the UL and the DL RSSI increases, as retry counts increase either on the UL or DL and as retry asymmetry increases, the link usability value or grade gets lower. The link usability value or grade can also change based on one or more of these factors. It should be noted that this value can also be applied to the coverage map for devices of the same type, thus allowing the system to create a projected usability grade map to the Wi-Fi heat map. Naturally, such a map is predictive while individual device measurements establish a ground truth for that target device.

If a Wi-Fi signal is degraded to a point of being poor, and a cellular network is usable such as having a grade of okay (or better), the access point 346 can send a modified 802.11 BTM (BSS (Basic Service Set) Transition Management) message to the station. The BTM message can suggest to the station 342 to roam to LTE instead of staying on the Wi-Fi network. Normally, the BTM messages were developed for managing transitions from one AP to another AP. The BTM message in this disclosure is reconfigured and modified in order to provide a suggestion or instruction to transition away from the Wi-Fi network. The BTM message can also be called a suggestion to perform some kind of switch or transition. This message can be derived from the multi-band operations (MBO) 802.11v BTM message allowing a station to be pushed (suggestion that the station "should roam") to another Wi-Fi radio. In this disclosure, the roaming suggestion is made to the LTE link instead of to another Wi-Fi radio.

The message can be configured in various ways. For example, the message can be a strong suggestion to transition to a cellular network. The message may be a general suggestion or a weak suggestion. The message may also be a direct instruction that the mobile station has to obey. The system may determine at what level of the suggestion/instruction should be based on one or more factors. The mobile station can be programmed to react according to the message.

It should be noted that the system does not need to know the details of the LTE link (e.g., eNB identity or others), beyond the fact is that the link is presently available and has performance values that are sufficient for use by the station. For example, the system may only know that the station is seeing the cellular network with the signal strength of two or more bars. The purpose in one aspect may not be to force the station to a particular LTE connection, but to push the station to switch its data traffic from the preferred Wi-Fi link to the existing LTE link without waiting for the station to realize that the Wi-Fi link has become unusable. Again, absent the suggestion, the station can take 5 to 6 seconds after the last successful exchange with the AP to perform a transition to LTE.

In one example, a message that can be characterized as an instruction or a strong suggestion could cause the mobile station to immediately initiate a transition to LTE. A general suggestion message might cause the station to wait for one second before transitioning or to consider one or more factors in determining whether to seek to remain on a Wi-Fi network. A weak suggestion message might cause the station to wait for two seconds before transitioning or to consider transitioning in view of one or more factors.

The system also can observe the station reactions that trigger transitions. In all likelihood, the station 342 should, upon a decision to transition, switch its Wi-Fi link off and jump to LTE. Switching off in this context can mean de-associating with an AP but can also mean stopping all data traffic temporarily while traffic is switched to LTE. Then, the station 342 would likely attempt to find a better AP by scanning different channels and eventually de-associating if no better option is found and the station view matches the infrastructure view. However, in some cases, it may be that the station 342 ends up sending a re-association message to the previous AP or neighboring AP thus signaling that its view of the usability of the Wi-Fi network was different from that of the infrastructure.

It may also happen that the infrastructure observes the station ignoring the jump to LTE message and continues to extract its traffic exchange over the Wi-Fi link. As each station and its form factor are known, the system can learn from the station behavior, such as whether the station roams to LTE or not, and what location that roam is detected, and can correlate with the station-reported LTE and Wi-Fi signal grade. Where the Wi-Fi-to-LTE transition effectively happens, the system can push the domain edge boundary accordingly, thus adapting its messaging to the station. The dynamic nature of the edge boundary can be based on such factors as one or more of the operating system version, the hardware version, the LTE provider (e.g. 8-bits of SID/NID), and so forth. The station settings can thus cause the boundaries 322 to be elastic and to change based on one or more of these parameters. This can be achieved by adapting the above combined coefficient to the station form factor to determine the grade value at which the station sees Wi-Fi-to-LTE boundary. For example, in one aspect, the device sees the cell boundary Wi-Fi is poor at combined coefficients −274 while a different device having a different configuration sees a cell boundary at −286.

Figure 3D:
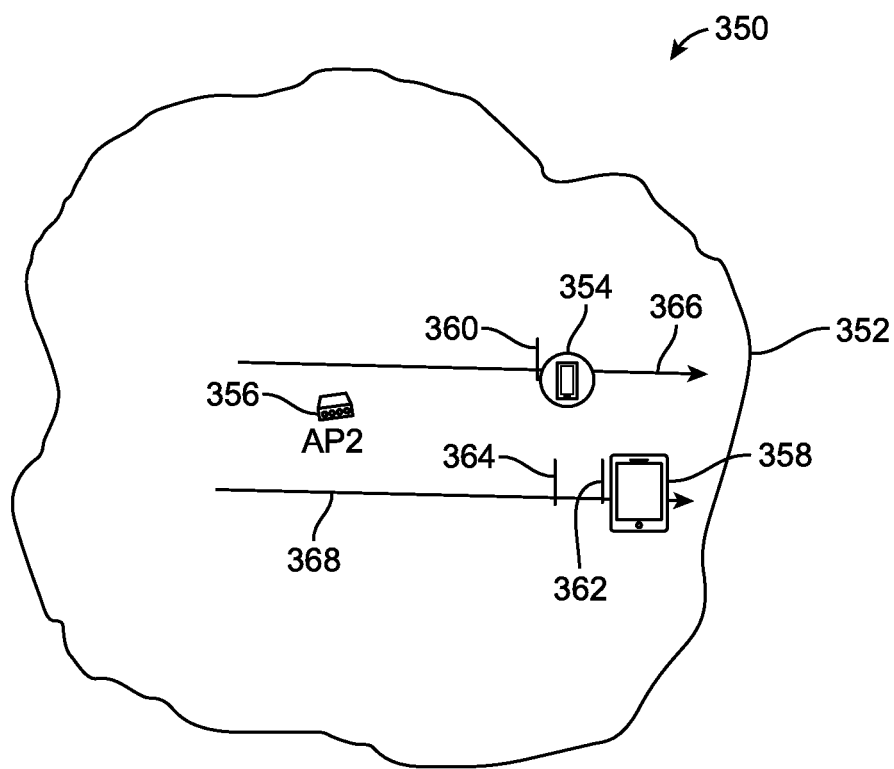
FIG. 3D illustrates an elastic edge boundary based on a device type.

FIG. 3D illustrates the elastic boundary given the environment 350. The AP2 356 has a coverage area defined by feature 352. As shown, a first device 354 has a first characteristic and might be moving in direction 366 towards the boundary 352. Point 360 can be the optimal roaming trigger point for the device of that type. However, a second device 358 might be moving in direction 368 towards the same boundary 352. Point 354 might be too early as a roaming triggering point for device 358. Point 362 might be the optimal roaming trigger point for device 358 given its different characteristics when compared to device 354. The result of this process is a faster transition to LTE, typically under a second rather than 5-6 seconds. The disclosed approach makes sure that any disruptions to real time applications can be minimized when making such a transition.

Figure 4:
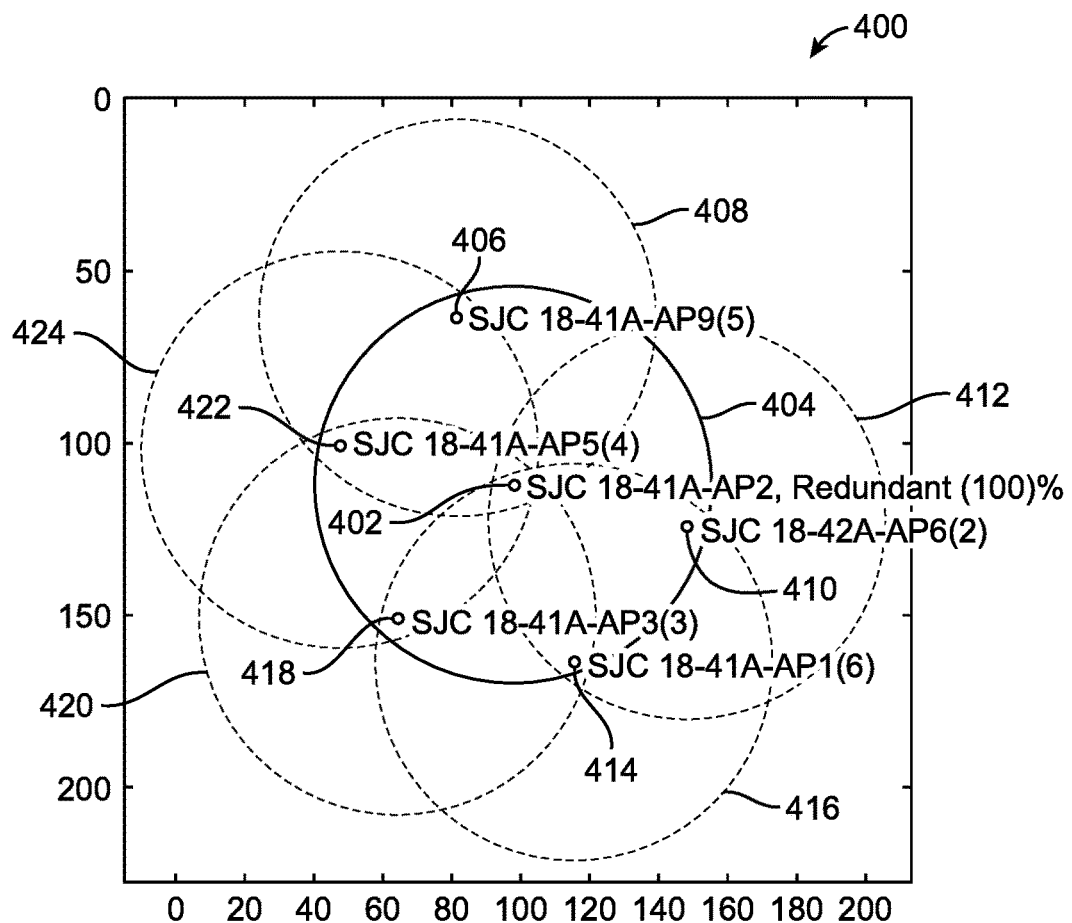
FIG. 4 illustrates a series of access points and their coverage areas.
Figure 5:
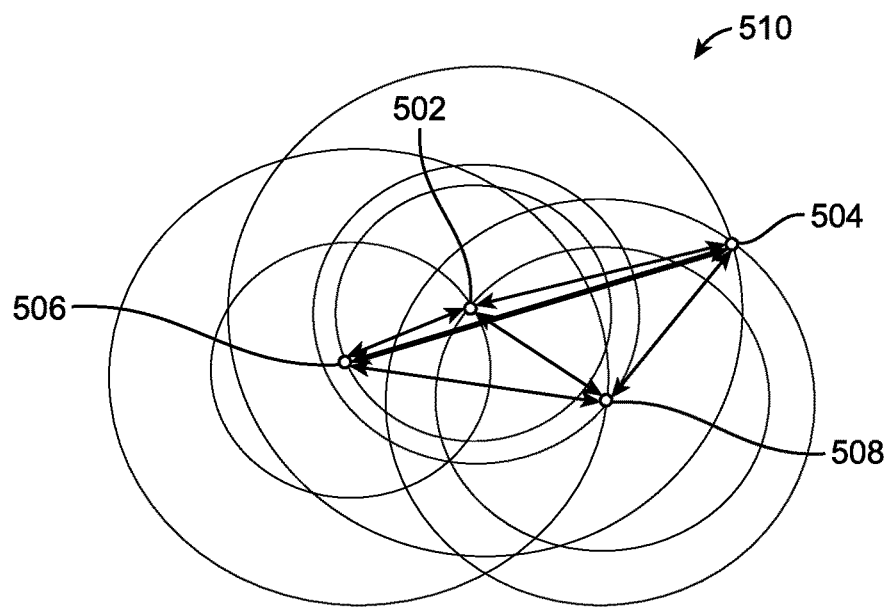
FIG. 5 illustrates a trilateration approach to determine relative access point positions.

FIG. 4 illustrates a series of APs and their associated coverage areas (402,404) (406,408) (410,412) (414,416) (418,420) (422,424). The overall coverage domain 400 is shown. One aspect of this disclosure is to identify APs at an edge of the Wi-Fi coverage domain. This can be done using known techniques such as floor map information (PI/DNAC/CMX or the like) or by leveraging trilateration between the inter-Access Points signal strength and overlaying RF constellations. Under this approach, APs determine their RF neighbors through regular methods such as neighbor discovery packets over the air. Then, trilateration is used in a similar way for client mobile stations, but applied to APs so as to determine APs relative positions. In FIG. 5, the network 500 of different APs is evaluated using the inter-AP signal strength to create an overlay RF constellation and identify relative positions between the access points 502, 504, 506, 508. This approach allows the system to determine which APs are on the edge of the coverage domain and which APs can be considered "inside" the domain where there are other APs around. In FIG. 5, APs 504 and 506 could be determined to be APs configured on the edge of the shown coverage domain 510. In another aspect, even an interior AP (one away from an edge or boundary) can provide a message to suggest that the station transition to a cellular network.

Figure 6:
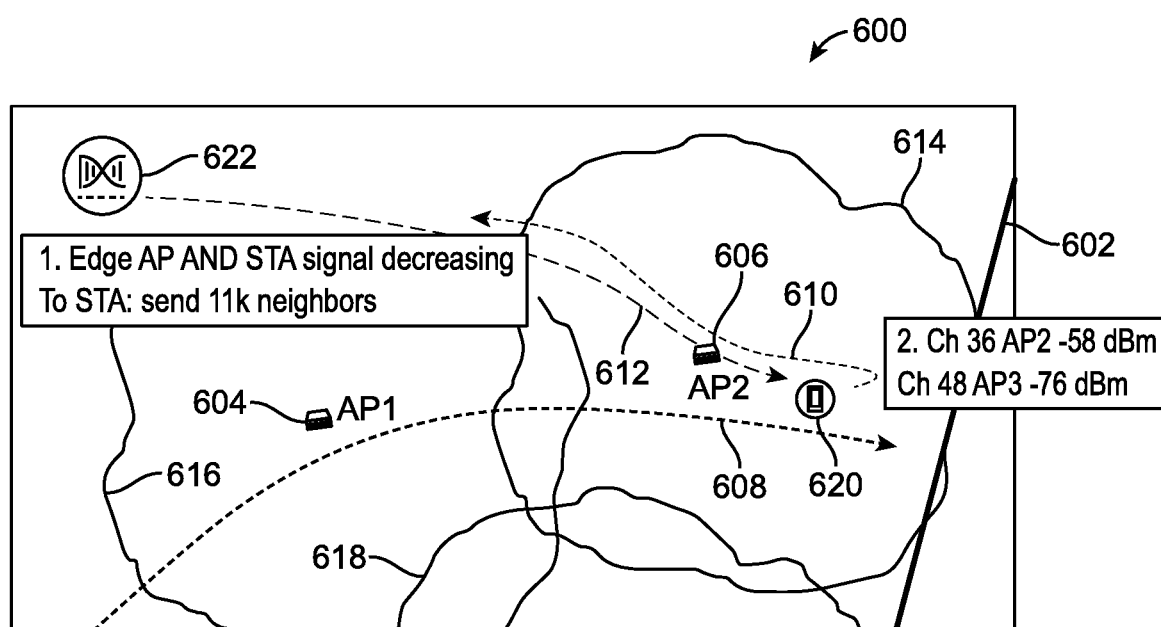
FIG. 6 illustrates an example edge of a domain and edge access points in connection with roaming stations.

FIG. 6 illustrates an example of an environment in which different access points AP1 604 with its coverage area 616 and AP2 606 with its coverage area 614 as well as coverage area 618 of a neighboring access point help to define an edge of the domain 602. The AP2 606 can be considered an edge-of-the-domain-AP 606. As the stations 620, 622 associate or roam to the edge 602, the system (e.g. WLC, DNAC) starts sending requests for 802.11k neighbor reports at certain intervals. No such request is made for association to APs that are not at the edge of the domain 602. In other aspects of this disclosure, request might be made to other APs such as AP1 604. This disclosure describes an approach to how a respective station sees the APs in thus providing both upstream and downstream views. Several aspects are envisioned for the request interval.

For example, in one aspect, the request interval can be inversely proportional to a station signal. Weaker stations can get requests more often. In a more advanced system, the system keeps a history of station respective form factors and their recorded uplink (UL) and downlink (DL) reported RSSI differences. Stations with a higher delta between UL and DL are queried more often than stations with lower deltas. Stations recorded with low deltas, such as |DL−UL|=3 dB or less can be labeled as "not queried."

Additionally, the station retry rate can be factored in to avoid straining the stations that are already suffering from degraded performance. Most requests are for the same channel view, such as how does the station see its current access point. In the larger intervals, scans on the channels of known neighboring APs can be performed as well.

With respect to device 622, its line of travel 612 can cause it to experience the edge AP2 606 and station signal decreasing to the station 622. This would cause a request to be sent to the 802.11k neighbors. With respect to device 620, and its path of movement 610 away from the edge 602, it might experience data such as on channel 36, a signal associated with AP2 606 of −58 dBm and a signal on channel 48 associated with AP3 (not shown but with coverage area 618) of −76 dBm.

Additionally, the load of neighboring APs can be factored to determine if a neighboring AP is a good roaming candidate for the station. For example, the link rate quality can be set to a lower value of the candidate AP is already high.

Figure 7:
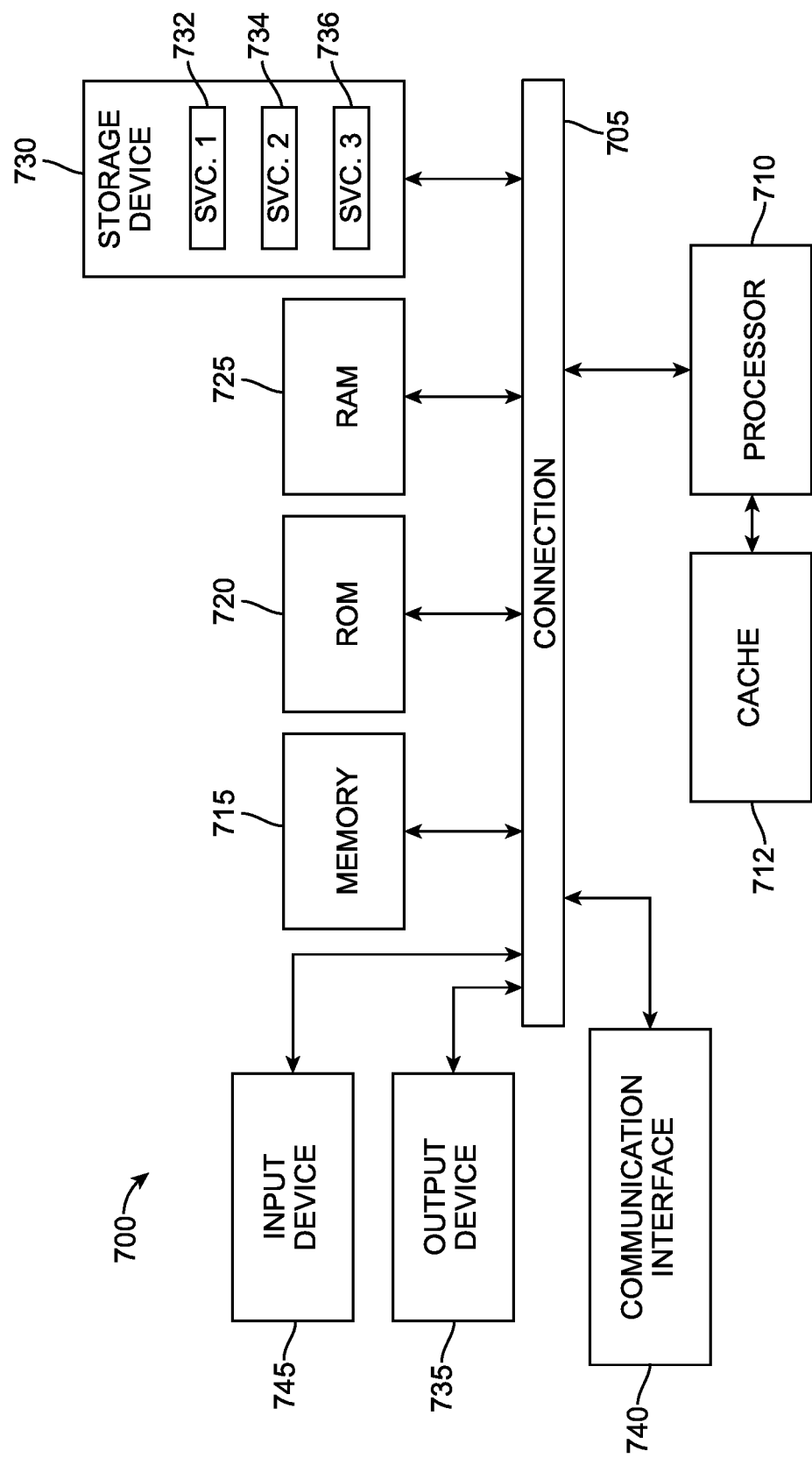
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

Figure 8:
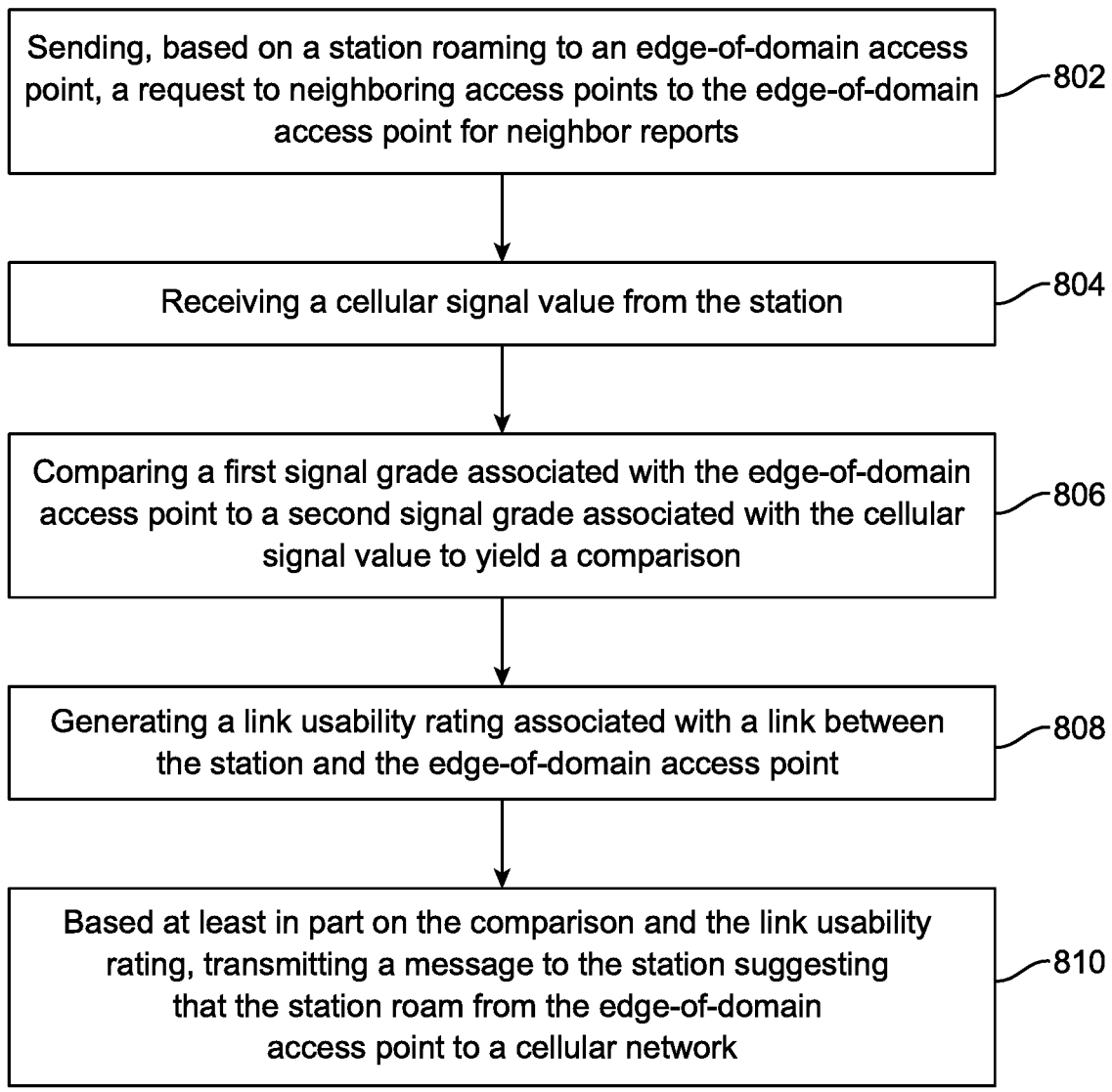
FIG. 8 illustrates a method embodiment.

FIG. 8 illustrates a method example related to sending a message instruction a mobile station to transition to a cellular network. As shown, a method can include one or more of sending, based on a station roaming to an edge-of-domain access point, a request to neighboring access points to the edge-of-domain access point for neighbor reports (802), receiving a cellular signal value from the station (804), comparing a first signal grade associated with the edge-of-domain access point to a second signal grade associated with the cellular signal value to yield a comparison (806) and generating a link usability rating associated with a link between the station and the edge-of-domain access point (808). Based at least in part on the comparison and the link usability rating, the method can include transmitting a message to the station suggesting that the station roam from the edge-of-domain access point to a cellular network (810). The sending step can occur at one or more of a regular interval, an interval inversely proportional to a strength of a station signal, an interval based on a history of station form factors and recorded uplink and downlink reported RSSI differences, and an interval based on a station retry rate. Other factors or combination of factors can also be applied to alter the interval. In one aspect, the interval is static and set throughout the process while in another aspect, the interval can be dynamic and constantly changing based on current circumstances or predicted circumstances.

The cellular signal value can include one or more of a cellular type, a cellular level, a form factor and a cell ID. Generating the link usability rating further can include comparing an upstream signal to a downstream signal to generate an asymmetry coefficient matching. The asymmetry coefficient matching can impact the link usability rating. For example, the greater the asymmetric coefficient matching or asymmetric coefficient, the lower the link usability rating can be.

In one aspect, generating the link usability rating further can include one or more of evaluating a retry rate to generate a retry coefficient and measuring a difference between an UL retry count and a DL retry count to generate a retry asymmetric coefficient.

The link usability rating can vary based on one or more of a degradation of RSSI, a level of asymmetry between an UL RSSI and a DL RSSI, a number of retry counts associated with an UL, a number of retry counts associated with a DL, and a retry asymmetry. In one aspect, the message that is used to suggest a jump to a cellular network can be a modification of an 802.11 transition message which is configured to suggest a transition to a cellular network. Previously, the 802.11 message only suggested transitioning to another Wi-Fi AP.

In some cases, the message can be a suggestion to transition to a cellular network which the station can take into account in its determination of whether to transition. Thus, in this scenario, the station is not required to make the change but only receive the suggestion. When the station does not transition to the cellular network based on the message, the method can further include reducing service to the station offered from the edge-of-domain-AP to encourage the station to transition to the cellular network. For example, the edge-of-domain-AP might begin to reduce the available bandwidth to the station, or might limit the number of available channels available to the station. The edge-of-domain-AP might weaken it signal to make it appear as though is further away from the station than it actually is. Any number of different activities can be taken by the edge-of-domain-AP in order to encourage the station to transition to the cellular network. In one aspect, the priority of steps that might be taken by the edge-of-domain-AP can be dependent upon a type of station, such as whether the station is in iPad, a laptop computer, or a mobile phone. The steps taken, the priority of those steps or an order of those steps could also be dependent on other factors such as the heat map associated with the cellular network overlay or other factors.

In another aspect, it is contemplated that the message that is sent by the AP to the station is not a suggestion but a command or instruction that must be followed. The message could essentially say that in 0.5 seconds, communication with the access point will be eliminated and therefore the station that needs to begin to transition to the cellular network. The message could indicate that the data stream connection with the AP will be limited or eliminated while control streams and/or boy streams can continue. In general, the message that is sent can be sent is a suggestion accompanied by other encouraging factors or it could be an instruction which must be obeyed depending on the established protocol and standards between the two devices. Further, as noted above, the message can have a priority level or strength of suggestion. The strength can be defined by a value such as on a scale from 1 to 10, with a 10 suggestion meaning a very strong suggestion and a 1 suggestion being a very weak suggestion.

In response to the message, the station can transition at least a portion of its traffic from the edge-of-domain-AP to the cellular network. In this regard, the decision made by the station may involve transitioning a portion of its data from the edge-of-domain-AP to the cellular network. The portion could be the datalink, or an audio link, messaging streams, control streams, and so forth.

While the description above with respect to FIG. 8 is provided from the standpoint of the system, an AP or a DNAC, it is also envisioned that the steps that are performed could be considered in the context of functions performed by the station. For example, a method could include transmitting information element reports from the station to the AP, and receiving a message which can embody a suggestion to transition to a cellular network that is to be considered to an instruction that must be followed to transition to the cellular network. An aspect of this disclosure relates to all of the steps that would be performed on the station as part of this process.

In response to the message, the station can stop sending data traffic to the edge-of-domain-AP until the station transitions to the cellular network. In another aspect, a definition of the edge of the domain of coverage area can be adaptive based on a characteristic of a respective station. The characteristic can be one or more of an operating system version, a physical characteristic of the respective station, a cellular service provider for the respective station, and a speed at which the respective station is moving. This aspect is explored next in FIG. 9.

Figure 9:
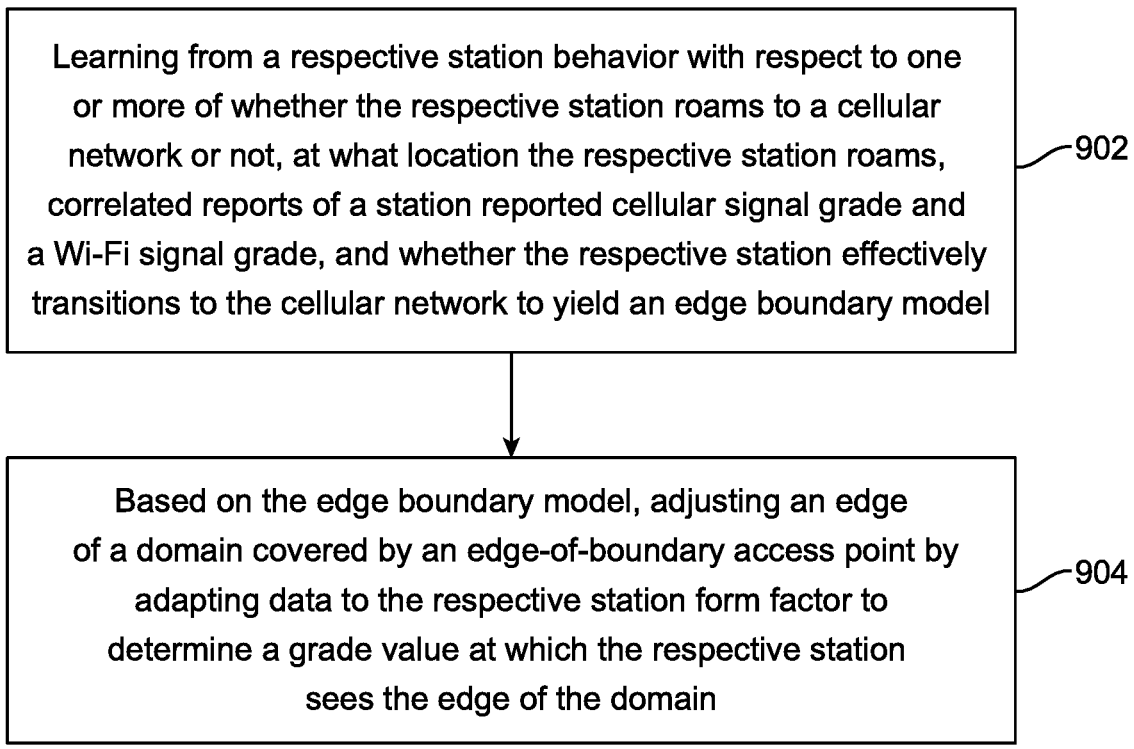
FIG. 9 illustrates another method embodiment.

FIG. 9 illustrates an aspect of this disclosure with respect to dynamic edge boundaries. The method includes learning from a respective station behavior with respect to one or more of: whether the station roams to a cellular network or not, at what location the station roams, data of correlation reports of a station reported cellular signal grade and a Wi-Fi signal grade, and whether the respective station effectively transitions to the cellular network to yield an edge boundary model (902), and based on the edge boundary model, adjusting an edge of a domain covered by an edge-of-domain-AP by adapting data to the respective station form factor to determine a grade value at which the respective station sees the edge of the domain (904). Under this approach, a dynamic edge boundary can be established which is applicable to separate station types or even individual stations and which is predictive according to those station types or other characteristics. As different types of stations interact with the system and provide their reports as described herein, the system can model or learn from that respective behavior and generate the edge boundary models such that for later movement within domains, each station type can see the Wi-Fi to cellular boundary that is appropriate to that station type and which will result in a faster and more efficient transition to a cellular network while reducing the disruption to real-time applications.

It is noted that based on this approach, the edge boundary model could also be applicable to individual stations based on other factors. For example, a first user might use a first Galaxy™ S10 and a second user might use a second Galaxy™ S10. These two stations would be of the exact same type. However, the patterns of use for the first user might be that they always transition from Wi-Fi to a cellular network while traveling 50 miles an hour as they approach the domain edge. The second user might walk and be going two miles an hour as their device transitions. What can occur in this scenario is that the system will establish a respective Wi-Fi-to-cellular boundary for each individual station which can be tailored to their movement patterns. Similarly, the data usage patterns might also be incorporated into the edge boundary model in which data usage, cellular telephone usage, movement data, messaging usage, and so forth can be taken into account when establishing the boundary for any individual station. Any one or more of these factors can be combined in an analysis to confirm or establish the dynamic boundary for a respective station.

In another aspect, the system may determine that the user at a particular location typically initiates a real-time application such as a telephone call or a video chat. The system may learn through that history that it would be advantageous to establish a triggering edge position for the user's device in a particular location in order to properly transition to a cellular network in preparation for the use of a real-time data application.

The edge boundary models can be stored and retrieved based on a station type, a personal profile of individual users, a speed of the station, historical application use, or any of factors. For example, if the system applies edge boundary models based on station type, then as the system determines the respective type of the station, the system will retrieve the edge boundary model for that station and apply that model to determining what the dynamic boundary is for that station. If the edge boundary model is applicable to individual users or individual stations based on the factors described herein, then once the user is identified or the particular station is identified, then the associated edge boundary model would be retrieved and applied for establishing the dynamic boundary for that respective station. In another aspect, the system may retrieve an edge boundary model associated with the type of station and a personal edge boundary model associated with the individual person or that respective station and apply both models or combined both models together to arrive at an even more specific model for establishing a more appropriate boundary for that respective station. The models could also be applied serially.

Other factors that can come into play include a current time associated with a proposed transition or the station approaching a boundary. Additional factors can include emergency circumstances in the area, a load on the AP or cellular system based on other users, a priority of an individual user or of a respective station, a type of data that is being utilized or predicted to be utilized, and so forth. Any one or more of these factors can be incorporated into a model or added to a model in order to more adequately the establish a boundary for a given respective station.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. For example, claims could be drafted from the standpoint of one client, an agent or a sidecar proxy, the server 410, a transmitting client or receiving client, and so forth. All data communications which might be transmissions, receiving data, establishing tunnels, and so forth can be defined from the standpoint of any of these nodes or components within the overall network. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   sending, based on a station roaming to an edge-of-domain access point, a request to neighboring access points to the edge-of-domain access point for neighbor reports;
   receiving a cellular signal value from the station;
   comparing a first signal grade associated with the edge-of-domain access point to a second signal grade associated with the cellular signal value to yield a comparison;
   generating a link usability rating associated with a link between the station and the edge-of-domain access point; and
   based at least in part on the comparison and the link usability rating, transmitting a message to the station suggesting that the station roam from the edge-of-domain access point to a cellular network.

2. The method of claim 1, wherein the sending occurs at one or more of a regular interval, an interval inversely proportional to a strength of a station signal, an interval based on a history of station form factors and recorded uplink and downlink reported signal strength differences, and an interval based on a station retry rate.

3. The method of claim 1, wherein the cellular signal value comprises one or more of a cellular type, a cellular level, a form factor and a cell identification.

4. The method of claim 1, wherein generating the link usability rating further comprises comparing an upstream signal to a downstream signal to generate an asymmetry coefficient matching, wherein the asymmetry coefficient matching impacts the link usability rating.

5. The method of claim 4, wherein generating the link usability rating further comprises one or more of evaluating a retry rate to generate a retry coefficient and measuring a difference between an uplink retry count and a downlink retry count to generate a retry asymmetric coefficient.

6. The method of claim 1, wherein the link usability rating varies based on one or more of a degradation of signal strength, a level of asymmetry between an uplink signal strength and a downlink signal strength, a number of retry counts associated with an uplink, a number of retry counts associated with a downlink, and a retry asymmetry.

7. The method of claim 1, wherein the message comprises an 802.11 transition message configured to suggest a transition to a cellular network.

8. The method of claim 1, wherein when the station does not transition to the cellular network based on the message, the method further comprises:
   reducing service to the station offered from the edge-of-domain access point to encourage the station to transition to the cellular network.

9. The method of claim 1, wherein in response to the message, the station transitions a portion of its traffic from the edge-of-domain access point to the cellular network.

10. The method of claim 1, wherein in response to the message, the station stopped sending data traffic to the edge-of-domain access point until the station transitions to the cellular network.

11. The method of claim 1, wherein the edge-of-domain access point is near an edge of a domain of coverage area by the edge-of-domain access point.

12. The method of claim 11, wherein the edge of the domain of coverage area is adaptive based on a characteristic of a respective station.

13. The method of claim 12, wherein the characteristic comprises one or more of an operating system version, a physical characteristic of the respective station, a cellular service provider for the respective station, and a speed at which the respective station is moving.

14. A system comprising:
    at least one processor; and
    a computer readable storage device storing instructions which, when excused by the at least one processor, cause the at least one processor to perform operations comprising:
    sending, based on a station roaming to an edge-of-domain access point, a request to neighboring access points to the edge-of-domain access point for neighbor reports;
    receiving a cellular signal value from the station;

comparing a first signal grade associated with the edge-of-domain access point to a second signal grade associated with the cellular signal value to yield a comparison;

generating a link usability rating associated with a link between the station and the edge-of-domain access point; and based at least in part on the comparison and the link usability rating, transmitting a message to the station suggesting that the station roam from the edge-of-domain access point to a cellular network.

15. The system of claim 14, wherein the sending occurs at one or more of a regular interval, an interval inversely proportional to a strength of a station signal, an interval based on a history of station form factors and recorded uplink and downlink reported signal strength differences, and an interval based on a station retry rate.

16. The system of claim 14, wherein the cellular signal value comprises one or more of a cellular type, a cellular level, a form factor and a cell identification.

17. The system of claim 14, wherein generating the link usability rating further comprises comparing an upstream signal to a downstream signal to generate an asymmetry coefficient matching, wherein the asymmetry coefficient matching impacts the link usability rating.

18. The system of claim 17, wherein generating the link usability rating further comprises one or more of evaluating a retry rate to generate a retry coefficient and measuring a difference between an uplink retry count and a downlink retry count to generate a retry asymmetric coefficient.

19. The system of claim 14, wherein an edge of a domain of coverage area associated with the edge-of-domain access point is adaptive based on a characteristic of a respective station.

20. The system of claim 19, wherein a characteristic comprises one or more of an operating system version, a physical characteristic of the respective station, a cellular service provider for the respective station, and a speed at which the respective station is moving.

\* \* \* \* \*